(12) United States Patent
Nagpal et al.

(10) Patent No.: US 9,037,796 B2
(45) Date of Patent: May 19, 2015

(54) SYSTEM AND METHOD FOR OPTIMIZING DATA REMANENCE OVER HYBRID DISK CLUSTERS USING VARIOUS STORAGE TECHNOLOGIES

(71) Applicant: International Business Machines Corporation, Armonk, NY (US)

(72) Inventors: Abhinay R. Nagpal, Pune (IN); Sandeep R. Patil, Pune (IN); Sri Ramanathan, Lutz, FL (US); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/279,542

(22) Filed: May 16, 2014

(65) Prior Publication Data

US 2014/0250089 A1 Sep. 4, 2014

Related U.S. Application Data

(63) Continuation of application No. 13/922,319, filed on Jun. 20, 2013, which is a continuation of application No. 12/782,027, filed on May 18, 2010, now Pat. No. 8,495,296.

(51) Int. Cl.
*G06F 12/00* (2006.01)
*G06F 17/30* (2006.01)
*G06F 21/00* (2013.01)
*G06F 3/06* (2006.01)
*G06F 21/78* (2013.01)

(52) U.S. Cl.
CPC ........ *G06F 17/30156* (2013.01); *G06F 3/0623* (2013.01); *G06F 3/0652* (2013.01); *G06F 3/0685* (2013.01); *G06F 2221/2143* (2013.01); *G06F 21/78* (2013.01); *G06F 17/30117* (2013.01)

(58) Field of Classification Search
None
See application file for complete search history.

(56) References Cited

U.S. PATENT DOCUMENTS

| 6,256,646 B1 | 7/2001 | Starek et al. |
| 7,246,209 B2 | 7/2007 | Tran et al. |

(Continued)

OTHER PUBLICATIONS

Siemens AG et al. "Protection of sensitive data against loss on lifecycle limited devices." Aug./Sep. 2006.*

(Continued)

*Primary Examiner* — Alford W. Kindred
*Assistant Examiner* — Daniel Bernard
(74) *Attorney, Agent, or Firm* — Matthew Chung; Roberts Mlotkowski Safran & Cole, P.C.

(57) ABSTRACT

A method is implemented in a computer infrastructure having computer executable code tangibly embodied on a computer readable storage medium having programming instructions. The programming instructions are operable to optimize data remanence over hybrid disk clusters using various storage technologies, determine one or more data storage technologies accessible by a file system, and determine secure delete rules for each of the one or more storage technologies accessible by the file system. The secure delete rules include a number of overwrites required for data to be securely deleted from each of the one or more storage technologies. The programming instructions are further operable to provide the secure delete rules to the file system upon a request for deletion of data for each of the one or more storage technologies a specific amount of times germane to secure delete data from the one or more storage technologies.

9 Claims, 4 Drawing Sheets

(56) References Cited

U.S. PATENT DOCUMENTS

| | | |
|---|---|---|
| 7,269,741 B2 | 9/2007 | Matsui et al. |
| 7,327,484 B2 | 2/2008 | Yamashita et al. |
| 8,130,554 B1 | 3/2012 | Linnell |
| 8,140,804 B1 | 3/2012 | Sobel et al. |
| 2006/0021005 A1 | 1/2006 | Williams et al. |
| 2006/0200357 A1 | 9/2006 | Dewey |
| 2006/0259468 A1 | 11/2006 | Brooks et al. |
| 2007/0067595 A1 | 3/2007 | Ghose |
| 2007/0150887 A1 | 6/2007 | Shapiro |
| 2007/0174546 A1 | 7/2007 | Lee |
| 2007/0186039 A1 | 8/2007 | Nam |
| 2007/0192534 A1 | 8/2007 | Hwang et al. |
| 2008/0140909 A1 | 6/2008 | Flynn et al. |
| 2008/0304668 A1 | 12/2008 | Williams et al. |
| 2009/0100212 A1 | 4/2009 | Boyd et al. |
| 2009/0100235 A1 | 4/2009 | Fukuguchi |
| 2010/0122047 A1 | 5/2010 | Vasilievna et al. |
| 2010/0138619 A1 | 6/2010 | Benavides |
| 2010/0161882 A1 | 6/2010 | Stern et al. |
| 2011/0154060 A1 | 6/2011 | Guyot et al. |
| 2012/0079603 A1 | 3/2012 | Brown et al. |
| 2013/0067273 A1 | 3/2013 | Fiske et al. |
| 2013/0091543 A1 | 4/2013 | Wade et al. |
| 2013/0144845 A1 | 6/2013 | Ghuge et al. |
| 2013/0185555 A1 | 7/2013 | Wang et al. |
| 2013/0268740 A1 | 10/2013 | Holt |

OTHER PUBLICATIONS

Hughes et al. "Disposal of Disk and Tape Data by Secure Sanitization." IEEE Security & Privacy, pp. 29-34, Jul./Aug. 2009.*

Gutmann, Peter, "Secure Deletion of Data from Magnetic and Solid-State Memoty", Sixth USENIX Security Symposium Proceedings, San Jose, CA, Jul. 22-25, 1996.

* cited by examiner

SYSTEM AND METHOD FOR OPTIMIZING DATA REMANENCE OVER HYBRID DISK CLUSTERS USING VARIOUS STORAGE TECHNOLOGIES

FIELD OF THE INVENTION

The present invention generally relates to a system and method of securely purging and/or deleting and/or secure movement of data, and more particularly, to a system and method for optimizing data remanence over hybrid disk clusters using various storage technologies.

BACKGROUND

There are many types of data storage, each having their own advantages. For example, known data storage includes Solid State Drives (SSD), Hard Disk Drives (HDD), as well as newer technologies such as Phase Change Memory and Racetrack technology based disk storage. These technologies have different data remanence rules, each of which may require different levels of overwrites in order to sanitize the data.

SSD is based on volatile memory such as DRAM and is characterized by ultrafast data access, generally less than 10 microseconds. SSD is known to have fast start-up because there are no spin-up requirements. Also, SSD has fast random access because there is no read/write head. SSD is also known to have low read latency times and consistent read performance due to the location of data being irrelevant for SSD. For these and other reasons, SSD is becoming more common in the market place (as the advantages of SSD over disk drive storage are becoming more apparent).

HDD, on the other hand, is a non-volatile storage device that stores digitally encoded data on rapidly rotating disks with magnetic surfaces. HDD, unlike SSD, requires read/write heads as well as requiring spin-up. The spin-up requirement, though, is known to slow start up.

Phase-change memory (also known as PCM, PRAM or PCRAM) is a type of non-volatile computer memory. PRAM is one of a number of new memory technologies that are competing in the non-volatile role with Flash memory. PRAM uses the unique behavior of chalcogenide glass, which can be "switched" between two states with the application of heat, i.e., crystalline and amorphous. Recent versions of PRAM achieve two additional distinct states effectively doubling its storage capacity. Racetrack Memory is an experimental non-volatile memory device currently under development by International Business Machines Corp. It is expected that Racetrack will offer storage density higher than comparable solid-state memory devices like Flash RAM and similar to conventional disk drives, but with much higher read/write performance.

The level of overwrites required for each of these technologies may vary, depending on the level of security. For example, the level of overwrites required for a file present on HDD will be far more than a file present on SSD for secure file deletion. This is purely because both are different technologies of storing the underlying data. For this reason, there will be different data remanence rules for data residing on SSD and HDD, as well as other technologies. Of course, this creates an optimization problem for data remanence as some technologies may require a different number of overwrites than other technologies.

Data remanence is the residual physical representation of data that has been erased or overwritten. Minimizing data remanence is an act of securely purging the content such that there are no remains on storage. Specific methods of data remanence include overwriting, purging, degaussing, encryption, and physical destruction depending on the level of security and type of data storage. Specifically, a common method used is to overwrite the storage medium with new data. This is often called wiping or shredding a file or disk. Overwriting is generally an acceptable method of clearing, as long as the media is writable and not damaged. This methodology is a popular, low-cost option for some applications.

Data remanence is one of the vital aspects for data security over storage, as mandated by regulatory compliances. In fact, various standards of data remanence are published by the Department of Defense (DoD). For example, secure purging of data at file level to meet data remanence is the most common approach. Some of the delete operations over a file system can be extended to support different specifications of data remanence to implement secure delete. However, since data remanence involves multiple level of writing with different formats (depending upon the specification being implemented) it proves to be a costly to system performance as it is performing multiple I/O operations.

A problem is the data sanitization secure deletion of data is a costly affair as it involves multiple write cycles over file contents, before the file is deleted. Setting the incorrect overwrite level for each storage device optimizes the performance by reducing the deletes, rewrite, and reads on the disk. It also ensures the proper security level is applied to each disk across a sanitized delete. For example a file with size 1 GB may be striped across hybrid storage such that 250 MB of file data resides on HDD while 750 MB resides on SSD. Assuming that five (5) levels of overwrites on HDD is equivalent to three (3) levels of overwrite on SSD for same level of data sanitization, the existing methods execute 5 levels of overwrite across the entire 1 GB file without considering the underlying disk technology. So 750 MB of data which actually required only 3 levels of overwrite end up having 5 levels of overwrite impacting cost and performance. These processes are more performance intensive which consumes more power and is less environmentally friendly.

Accordingly, there exists a need in the art to overcome the deficiencies and limitations described herein above.

SUMMARY

In a first aspect of the invention, a method is implemented in a computer infrastructure having computer executable code tangibly embodied on a computer readable storage medium having programming instructions. The programming instructions are operable to determine one or more data storage technologies accessible by a file system. The programming instructions are operable to determine secure delete rules for each of the one or more storage technologies accessible by the file system. The secure delete rules include a number of overwrites required for data to be securely deleted from each of the one or more storage technologies. The programming instructions are operable to provide the secure delete rules to the file system upon a request for deletion of data for each of the one or more storage technologies a specific amount of times germane to secure delete data from the one or more storage technologies.

In another aspect of the invention, a method is implemented on a computer infrastructure having hardware. The method comprises loading data sanitization configuration rules required for supported storage technology. The data sanitization configuration rules includes a type of file storage and required overwrites needed to securely delete data on each type of file storage. The method further comprises providing the data sanitization configuration rules to a file system for sanitizing blocks of data as per the loaded data sanitization configuration.

In another aspect of the invention, a system is implemented in hardware. The system includes an optimizer tool that is operable to determine the amount of iterations of write cycles needed for deleting data in each of a plurality of data storage technologies accessible by a file system. The system provides the iterations to the file system for data sanitization over a plurality of the data storage technologies.

In an additional aspect of the invention, a computer program product comprising a computer usable storage medium having readable program code embodied in the medium is provided. The computer program product includes at least one component operable to: determine underlying storage technologies on which data resides and is accessible by a file system; and provide an amount of iterations needed to delete the data which is accessible by the file system and which resides on the underlying storage technologies in order to provide a secure delete of the data that resides on any of the underlying storage technologies.

In a further aspect of the invention, a computer system is provided for securely deleting data on hybrid storage systems. The system comprises a CPU, a computer readable memory and a computer readable storage media. Additionally, the system comprises first program instructions to optimize data remanence over hybrid disk clusters using various storage technologies by determining one or more data storage technologies accessible by a file system and providing secure delete rules for each of the data storage technologies in which data are to be deleted upon a request for deletion of data. The first program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
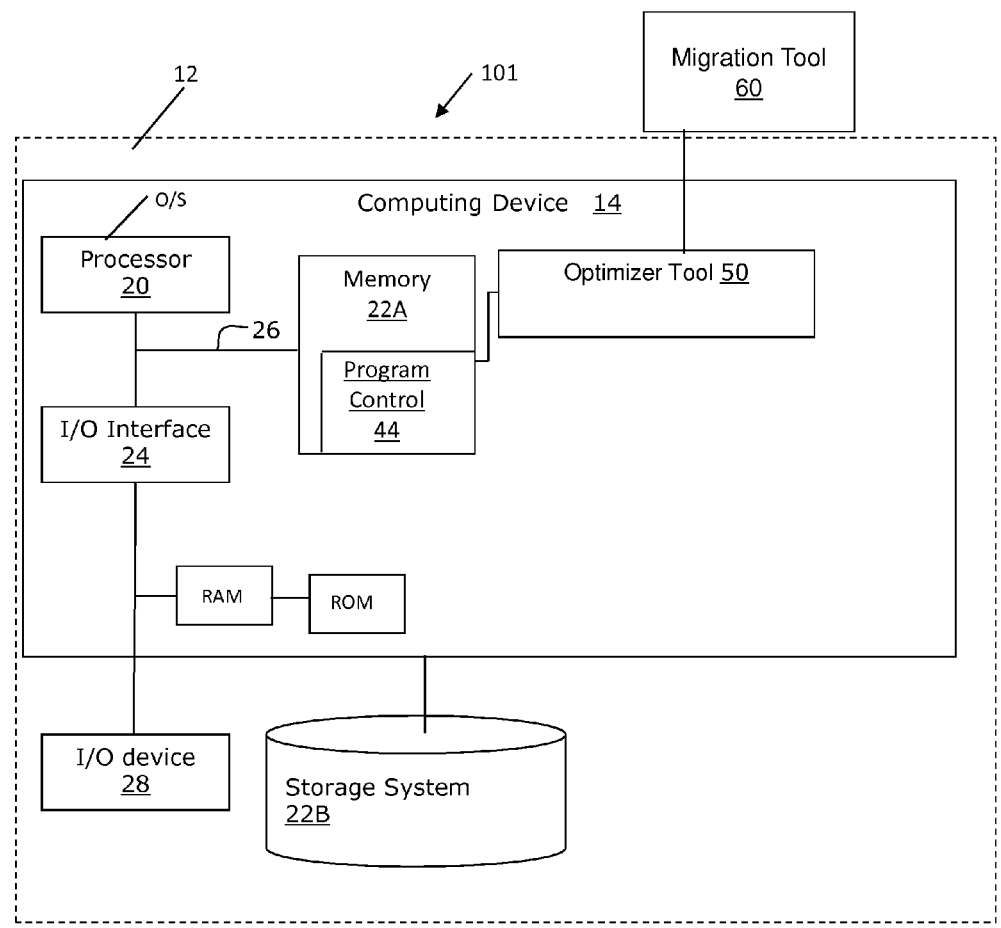
FIG. 1 an illustrative environment for implementing the steps in accordance with aspects of the invention.

The present invention generally relates to a system and method of securely purging and/or deleting and/or secure movement of data, and more particularly, to a system and method for optimizing data remanence over hybrid disk clusters using various storage technologies. In implementation, the system and method of the present invention provides data sanitization based on different storage technologies. In embodiments, sanitization protocols of the present invention consider the underlying disk storage technology in order to optimize sanitization of data residing on different storage technologies, thereby fostering performance. That is, in embodiments, the system and method handles hybrid disk clusters intelligently such that files striped across such hybrid storage will be sanitized with optimum performance and cost.

The data sanitization may be provided, for example, purging and/or deleting data from any of a plurality of different storage technologies. The data sanitization may also occur after secure movement of data from one location to another location. By way of a specific example, when a file over a clustered file system needs be moved into another location (e.g., which may be another SAN governed by different file system or into tapes for back up), the secure movement of sensitive data requires to take care of the data remanence. In such cases, post movement of each block the data should be sanitized by a number of overwrites which as per the policy depends upon the underlying storage technology.

Current secure file deletion utilities provided by the operating system and independent, secure file deletion utilities do not consider the underlying disk technology when securely deleting files residing over a clustered, hybrid storage such as General Parallel File System (GPFS). GPFS is a high-performance shared-disk clustered file system. Like some other cluster file systems, GPFS provides concurrent high-speed file access to applications executing on multiple nodes of clusters. In addition to providing file system storage capabilities, GPFS provides tools for management and administration of the GPFS cluster and allows for shared access to file systems from remote GPFS clusters.

By way of example, when a file is deleted or moved across hybrid storage clusters, currently it is not optimized for hybrid storage. This is basically because the secure delete programs are not cognizant of the underlying disks technology operating over clustered file systems or offerings supporting striping of data. So, when such files are securely deleted/purged/erased/moved (also referred to as a secure delete operation) the existing tools do not consider the fact that the file is striped across different technologies which require different levels of overwrite. For example, a file residing over HDD may require five (5) rounds of overwrite before its considered as securely deleted; whereas, at the same time if the same file is present on SSD it may require three (3) rounds of overwrite before its considered as securely deleted.

Thus, currently secure delete programs are not cognizant of the underlying storage disk technology and tend to do a vanilla delete. Hence they tend to run larger number of overwrite cycles for each block (for a given file), which directly impact on system performance, consume more energy and dissipate more heat. If this is mapped to real time production systems, data centers and Data Clouds (e.g., holding teradata of information) the figures are substantial.

Advantageously, the present invention takes into account the underlying storage technology when securely deleting the files. With the system and method of the present invention, it is now possible to obtain enhanced performance because the deletion will execute only the required number of write cycles for every block (for a given file). This directly translates into less number of writes and hence less energy and less power dissipation. Energy for overwrite and energy for cooling heat dissipation and the cost of carbon footprints released because of the excess heat dispassion directly impacts on the running cost.

By way of one example, in implementing the present invention, when files striped over hybrid storage via file systems like GPFS are securely deleted, the secure delete protocols of the present invention consider the underlying disk storage technology and act accordingly to optimize the secure delete operation. That is, the present invention considers the iteration of write cycles involved in the secure delete operation for the underlying disk storage technology on which the data resides such that the data is sanitized in a most optimized manner. Illustratively, during a secure delete operation of 1

GB file only 250 MB of data residing on HDD will be overwritten five (5) times while 750 MB of data residing on SSD (belonging to the same file) will be overwritten only three (3) times. This limits the costly write cycles, fostering system performance, saving power consumed by every write cycle and at the same time sanitizing the data as per norms. The present invention also contemplates the use of different storage technologies like SSD, HDD, Racetrack and Phase Change Memory and other storage technologies.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any storage medium that can contain, store, communicate, propagate, or transport the program for use by or in connection with the instruction execution system, apparatus, or device. The computer-usable storage medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44, which communicates with an optimizer tool 50, can implement the processes of the present invention. The optimizer tool 50, in embodiments, can be implemented as a disk agent or resident on a node (e.g., file system), and can include its own dedicated processing hardware.

In embodiments, the optimizer tool 50 is configured and/or operable to determine an underlying storage technology and the required overwrites needed to securely delete the data stored in such storage technologies, and provide such information to a file system for securely deleting data residing on different storage technologies. In this way, the optimizer tool 50 can optimize the delete or overwrite operations in hybrid storage via file systems like GPFS. Illustratively, the optimizer tool 50 considers the iteration of write cycles involved in the secure delete operation for the underlying disk storage technology on which the data resides in order to sanitize the data in an optimized manner. The present invention (e.g., optimizer tool 50) can be implemented with any storage technologies such as, for example, SSD, HDD, RAID, Racetrack and Phase Change Memory, to name a few.

As one example, when a node (of a file system) receives a delete request, it queries the disk deletion rules obtained by the optimizer tool 50. The optimizer tool 50 will instruct the node of the type of disk storage and how many writes is required to perform per each disk type in the file system. An XML representation of a typical rule set for the disk agent is:

```
<storage Type="SSD">
<overwrites="3">
</storage>
<storage Type="HDD">
<overwrites="5">
</storage>
```

In further embodiments, during secure deletion, when the overwrite takes place the content does not have to be read into memory; instead, it may be a direct overwrite. But, in further embodiments, it is contemplated that the present invention can be extended to provide analyze and secure delete functions. For example, where the secure delete program has to "randomly" analyze "x" number of blocks to check if the content of the file possibly contains material that qualifies for "N" level of data cleaning, analysis can be performed by comparison of the file content against specific word/rules. In this case, a read operation would be required. In this scenario, the delete implementation will explicitly analyze the blocks on SSD as the read cycle of SSD is much faster than HDD, which would then provide gains in performance.

In a contemplated analyze and secure delete based operation, the system and methods of the present invention may randomly analyze the content of the file (i.e., by reading some content of the file and comparing against a rule which helps tell what level of overwrite may be required for the file). Illustratively, this exercise may require reading 5000 blocks of a given file. In existing systems, the program simply randomly scans the content of the file; whereas, the present case will explicitly scan the content of the file which resides on SSD, which internally results in reading of blocks on the SSD. As the read cycle on SSD are faster than HDD, it is also possible to obtain performance gain.

In additional embodiments, if the clustered file system is tuned in such a way that all the classified sensitive information resides on SSD and non classified information resides on HDD (or other segmented schema, then the optimizer tool 50 can have an option which will help it or the file system securely delete only the blocks of a given data residing on one technology (e.g., SSD) and skip the secure delete on another technology (e.g., HDD portions). For example,

```
< Secure Delete Program> -
file < File Name> -n <number of overwrites> -diskflag
<SSD/HDD/PhaseChange/Racetrack, etc>
```

In this case the "diskflag" will help securely delete only the blocks residing on the particular disk technology. This will increase performance gains as it is now possible to perform a selective granular delete, as well as and compliments existing file system policy such as, for example, keeping classified sensitive data over a give disk technology (SSD for example).

Other examples of using the flag are also contemplated by the invention. For example, in a data center the customer may plan to replace all the HDD disks with SSD disks but wants to make sure that all the content on the HDD disks is securely deleted. In this example, the optimizer tool 50 can be merged with a migration tool 60 which will copy all the blocks that lie on HDD into newer SSD disk and later securely delete the block on HDD.

The system and methods of the present invention can also be integrated with disk defragmentation processes. In some implementations, disk defragmentation involves content that qualifies for secure deletion, i.e., it is vital to securely delete the block that is being repositioned from its original position. The system and methods of the present invention, e.g., optimizer tool 50, can be integrated in such scenario to achieve secure deletion. In this case the securely defragment can use the "-diskflag" with HDD or other storage technology that uses defrag operations when operating over the defragmentation block of a file.

The present invention can also be used with RAID1, RAID 3 and RAID 5. As should be understood by those of skill in the art, RAID, an acronym for Redundant Array of Inexpensive Disks or Redundant Array of Independent Disks, is a technology that allows high levels of storage reliability from low-cost and less reliable PC-class disk-drive components, via the technique of arranging the devices into arrays for redundancy. As an illustrative example, in RAID 1, the files are generally securely deleted from the primary set of disks and then from the mirrored set of disk. Hence, the secure delete program will be individually applicable for each of them. As an example, if there is a file with 3 blocks (e.g., 2 blocks on SSD and 1 block on HDD) and if one storage technology requires 3 overwrites (e.g., SSD) and one technology requires 5 overwrites (e.g., HDD), the present invention will require a total of 11 overwrites cycles (i.e., 2*3+5*1=11). With the same scenario, using exiting secure delete technologies, which are not aware of the underlying disk technology, 15 overwrites would be required (i.e., 5*3=15). With this said, the present invention provides a 26% performance improvement. If these 3 blocks were mirrored with a similar disk structure (e.g., using RAID 1) then it would require two deletion operations (e.g., once over the primary disk and once over the mirrored disk). Hence, it is possible to end up with 26% performance gain per mirror content.

The optimizer tool 50 can be implemented as one or more program code in the program control 44 stored in memory 22A as separate or combined modules. Additionally, the optimizer tool 50 may be implemented as separate dedicated processors or a single or several processors to provide the function of this tool. The optimizer tool 50 can be resident or part of the file system or can be a disk agent, running independent of the file system.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Examplary Implementation

Figure 2:
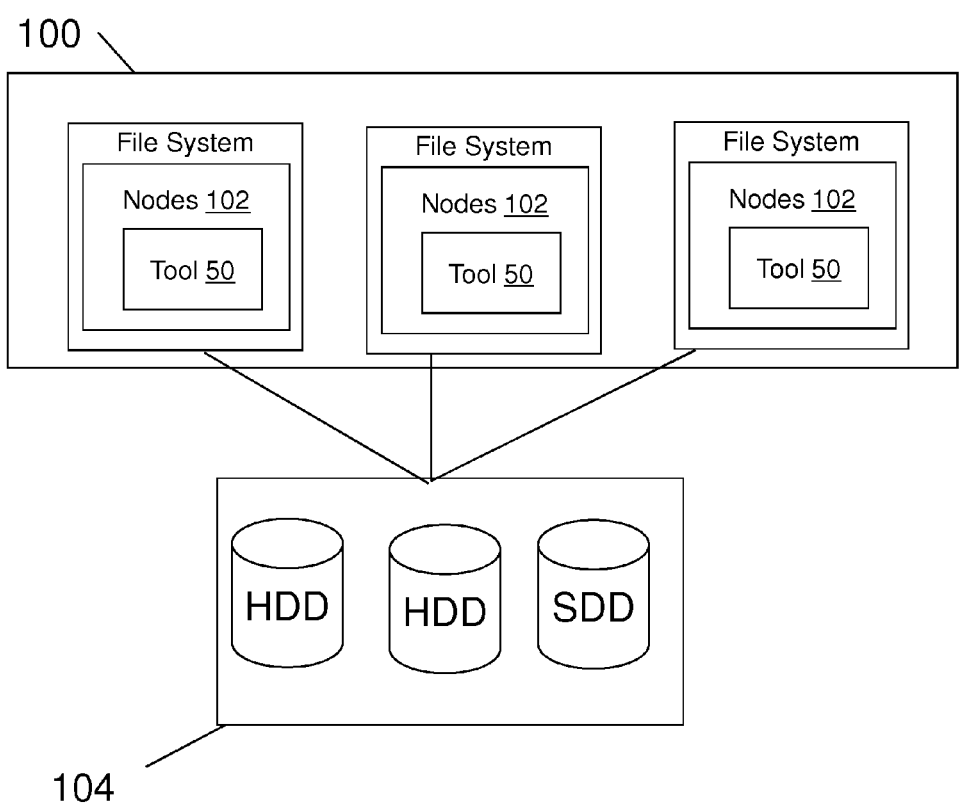
FIG. 2 illustrates a block diagram for an exemplary implementation in accordance with aspects of the invention.

FIG. 2 illustrates a block diagram for an exemplary implementation in accordance with aspects of the invention. More specifically, FIG. 2 shows a file system 100 with a plurality of nodes 102. In embodiments, the file system node 100 can be, for example, GPFS. In embodiments, the nodes 102 can include a optimizer tool (e.g., secure delete program) 50, each having a disk deletion rule. The optimizer tool 50 can also be an independent disk agent. In a contemplated implementation, when the node receives a delete request, it queries the disk deletion rules (of the optimizer tool 50) to determine how many writes is needed to perform secure deletions per each disk type in the file system (e.g., GPFS). In contemplated embodiments, a single optimizer tool 50 is resident on the file system node 100, or as a remote disk agent. The file system node 100 accesses data in a storage area network (SAN) 104, which can include a host of different storage technologies such as, for example, SSD or HDD, amongst others.

In embodiments, the optimizer tool 50 can set disk deletion rules, indicating the type of storage technology and the necessary overwrites required for secure deletion of data residing on the SAN 104. Although the disk deletion rules are shown contained on each server, they could be implemented in a persistent data store, such as a database or contained on the file system, or loaded in a singleton that is shared across the file system (GPFS). The disk deletion rules can be provided as an XML representation such as, for example,

```
<storage Type="SSD">
<overwrites="3">
</storage>
<storage Type="HDD">
<overwrites="5">
</storage>.
```

In further embodiments, the file system (e.g., GPFS) 100 stores metadata about the inodes, indirect blocks and datablocks on disk that describe how the file system is laid out. The file system (e.g., GPFS) 100 has an inode for each file that may be composed of direct or indirect blocks depending on the size of the file. In embodiments, the file system (e.g., GPFS) 100 data block map metadata is augmented to include the disk type that is being referenced for the data as follows:

```
<Block ID> <disk technology on which it resides>
<Block 1> HDD
<Block 2> SSD
<block 3> HDD
```

In this way, whenever a block is created or revised, the file metadata is automatically updated to show the storage area. Thus, the file system will always be aware of the storage type for each data block, and will be capable of providing an optimized overwrite (i.e., secure delete operation optimized for the storage technology). It is also contemplated to further optimize the system and methods by reducing the number of meta-data lookup required to check on which type of disk the block is residing. For example, by having 3 overwrites for the file and then 2 extra overwrites on the HDD the metadata lookup cycles will be reduced which will further optimize the process.

In a contemplated implementation, when the optimizer tool 50 is executed over a file striped across different storage technologies by the file system 100, the optimizer tool 50 will execute the secure operation (which typically involves overwriting data a number of times) per data block. For example, when the user runs the secure delete program, the disk deletion rules will inform the file system to delete the data by overwriting a predetermined amount of times. The file system can load this information into its memory, for example, for execution. By way of example, i) The optimizer tool 50 will load the data sanitization configuration required for every supported technology of disk from the configuration properties defined in the <storage>xml. In this way, it is possible immediately determine/know the type of file storage upon log in, for example.

ii) The optimizer tool 50 will interface with the file system to know the technology type of the disk on which the data block resides. In embodiments, in this implementation, the optimizer tool 50 may be running as an agent in the background, which is being updated at predetermined time periods by querying data information.

iii) The optimizer tool 50 or file system will sanitize the block as per the configuration.

Thus a file will be sanitized block by block and as per the requirements of the underlying disk technology thus resulting in a more granular and performance oriented data sanitization.

In one illustrative, non-limiting example using FIG. 2, the optimizer tool 50 can determine the number of overwrites needed for HDD and SSD technology, each of which are associated with file system 100. In this example, the optimizer tool 50 determines that the HDD requires 5 overwrites and the SSD requires 3 overwrites. In this example, the system and method of the invention would perform 3 overwrites for the file (on both HDD and SSD) and then 2 extra overwrites only for the blocks that reside on HDD, assuming that there is no disk lookup for each block for the first 3 overwrites. This is in comparison to the currently known schema in which blindly performs 5 overwrite for all of the files, regardless of the storage technology. Hence, by using the system and methods of the present invention, it is possible to obtain performance around the number of overwrites per block.

Flow Diagram

Figure 3:
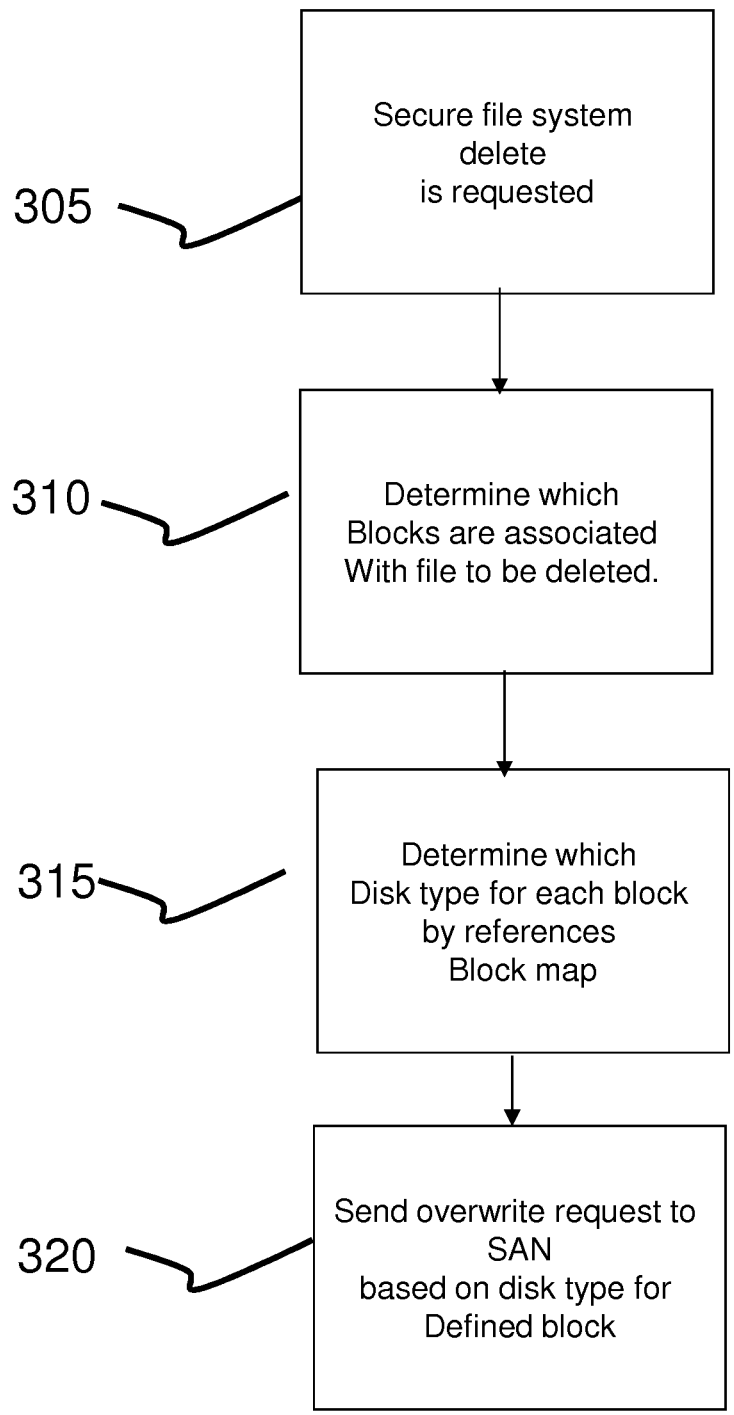
FIG. 3 shows an exemplary flow in accordance with aspects of the invention.
Figure 4:
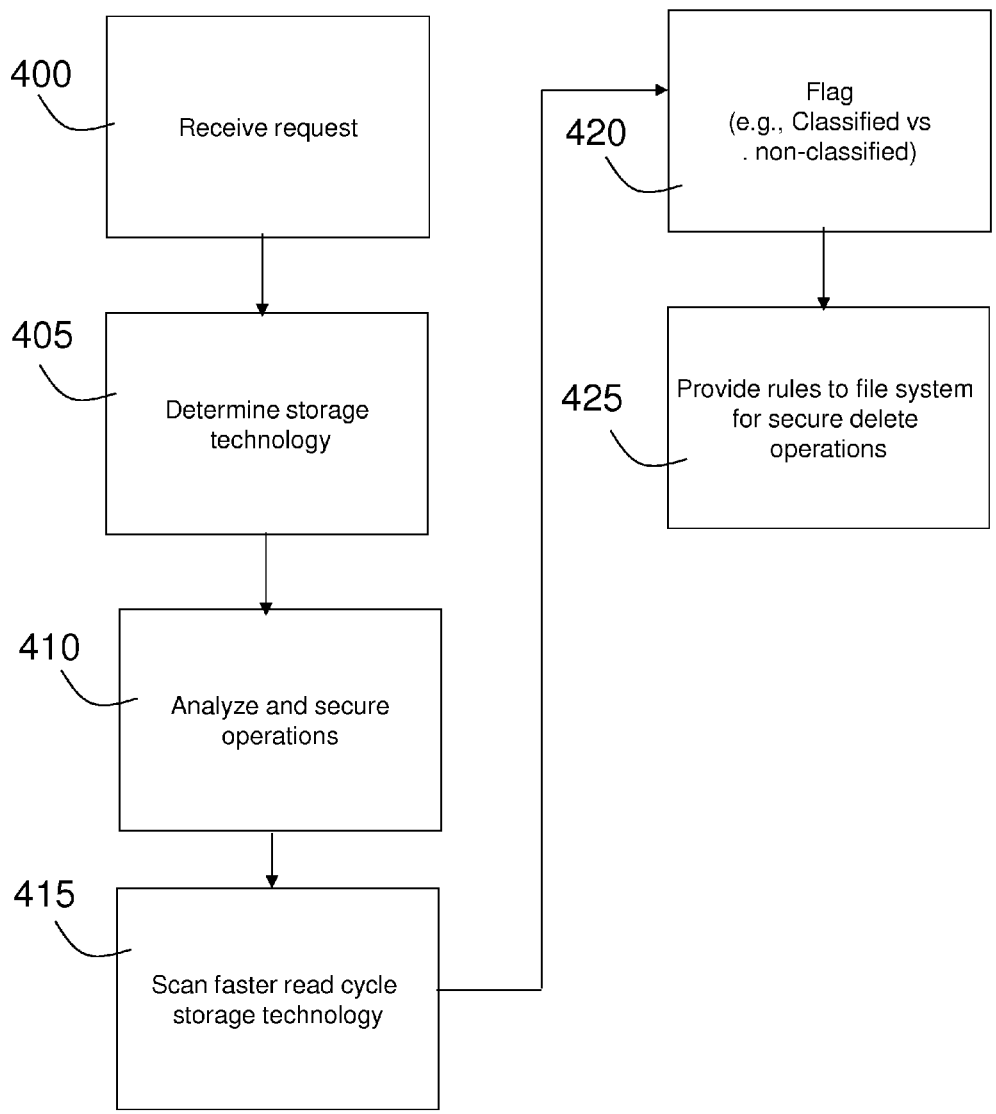
FIG. 4 shows an exemplary flow in accordance with aspects of the invention.

FIGS. 3 and 4 show an exemplary flow for performing aspects of the present invention. The steps of FIGS. 3 and 4 may be implemented in the environment of FIG. 1, for example. The flow diagram may equally represent a high-level block diagram or a swim-lane diagram of the invention. The flowchart and/or block diagram in FIGS. 3 and 4 (and any other flowcharts and/or block diagrams) illustrates the architecture, functionality, and operation of possible implementations of systems, methods and computer program products according to various embodiments of the present invention. In this regard, each block in any of the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow for a process in accordance with aspects of the present invention. More specifically, the exemplary flow illustrates a process for determining an optimized secure delete operation. As shown in FIG. 3, at step 305, a secure file system delete is requested. At step 310, the file system determines which blocks are associated with the file to be deleted. This can be performed by querying the optimizer tool. At step 315, the file system determines which file disk type for each block by referencing the data block map. The data block map can be created in the manner discussed above. At step 320, the file system sends an overwrite request to the SAN based on disk type for the defined block.

In this manner, the secure delete programs are cognizant of the underlying technology operating over clustered file systems. So, when such files are securely deleted/purged/erased the optimizer tool (secure delete programs) considers the fact that the file is striped across different technologies which require different levels of overwrite.

FIG. 4 shows another embodiment of the present invention. At step 400, the program control (e.g., optimizer tool) receives a delete request. At step 405, the program control, based on the delete request, determines an underlying storage technology and the required overwrites needed to securely delete the data stored in such storage technologies. This may be performed by querying disk deletion rules. In embodiments, at step 410, where the program control is performing analyze and secure operations, the program control will analyze "x" number of blocks to check if the content of the file contains material that qualifies for "N" level of data cleaning. The analysis can be performed by comparison of the file content against specific word/rules. In embodiments, at step 415, the program control can explicitly scan the content of the file which resides on storage technologies that have faster read cycles, e.g., SSD vs. HDD. That is, in embodiments, to improve performance, the program control will only scan the content of the file which resides on storage technologies that have faster read cycles. In additional or alternative embodiments, at step 420, if the clustered file system is tuned in such a way that all the classified sensitive information resides on one type of storage technology (e.g., SSD) and non-classified information resides on another type of storage technology, the program control can flag such files that are, e.g., classified, in order to ensure that the proper rules are applied for secure overwriting. In embodiments, the flag can be used for other purposes such as, for example, defrag operations when operating over the defragmentation block of a file. At step 425, the program control provides the appropriate disk deletion rules to a file system for securely deleting data residing on the different storage technologies. The secure delete may be due, for example, because data has been removed, deleted, purged or securely moved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:
1. A system comprising:
a CPU, a memory, and computer readable storage media;
program instructions to receive a delete request of data;
program instructions to determine one or more underlying storage technologies that are storing the data;

program instructions to determine secure delete rules for each of the one or more underlying storage technologies, wherein the secure delete rules include a number of times that overwrites are required for the data to be securely deleted from each of the one or more underlying storage technologies;

program instructions to analyze "x" number of file blocks of the data to check if content of the data contains material that qualifies for the number of times that the overwrites are required, wherein the "x" number of file blocks reside on a first storage device with a faster read cycle than a second storage device; and program instructions to provide the secure delete rules to a file system such that the file system need only overwrite the data stored on each of the one or more underlying storage technologies the number of times to securely delete the data from the one or more underlying storage technologies, wherein the program instructions are stored on the computer readable storage media for execution by the CPU via the memory.

2. The system of claim 1, wherein the analyzing the "x" number of file blocks comprises scanning and reading the content of the "x" number of file blocks.

3. The system of claim 1, wherein the analyzing the "x" number of file blocks comprises performing a comparison of the content of the data against the determined secure delete rules.

4. The system of claim 1, wherein the one or more underlying data storage technologies include Solid State Drives (SSD), Hard Disk Drives (HDD), Phase Change Memory, Redundant Array of Independent Disks (RAID), and Racetrack technology based disk storage.

5. The system of claim 1, wherein the secure delete rules are provided as an XML representation.

6. The system of claim 1, further comprising program instructions to flag specific types of data stored in the one or more underlying storage technologies to perform the overwrites needed to securely delete the data of the flagged specific types, based on the determined secure delete rules.

7. A computer program product comprising a computer readable hardware storage device and program instructions embodied in the computer readable hardware storage device, the program instructions comprising:

program instructions to determine one or more underlying storage technologies that are storing data requested for deletion;

program instructions to determine secure delete rules for each of the one or more underlying storage technologies, wherein the secure delete rules include a number of times that overwrites are required for the data to be securely deleted from each of the one or more underlying storage technologies;

program instructions to analyze "x" number of file blocks of the data to check if content of the data contains material that qualifies for the number of times that the overwrites are required, wherein the "x" number of file blocks reside on a first storage device with a faster read cycle than a second storage device; and program instructions to provide the secure delete rules to a file system such that the file system need only overwrite the data stored on each of the one or more underlying storage technologies the number of times to securely delete the data from the one or more underlying storage technologies.

8. The computer program product of claim 7, wherein the analyzing the "x" number of file blocks comprises scanning and reading the content of the "x" number of file blocks only on the first storage device.

9. The computer program product of claim 7, wherein the program instructions further comprise program instructions to flag specific types of data stored in the one or more underlying storage technologies to perform the overwrites needed to securely delete the data of the flagged specific types, based on the determined secure delete rules.

* * * * *